(12) United States Patent
Athsani et al.

(10) Patent No.: US 9,519,716 B2
(45) Date of Patent: Dec. 13, 2016

(54) SYSTEM AND METHOD FOR CONDUCTING A PROFILE BASED SEARCH

(75) Inventors: Athellina Athsani, San Jose, CA (US); M. Cameron Jones, San Jose, CA (US); Lawrence Gordon Tesler, Portola Valley, CA (US); Elizabeth F. Churchill, San Francisco, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 258 days.

(21) Appl. No.: 12/415,477

(22) Filed: Mar. 31, 2009

(65) Prior Publication Data

US 2010/0250578 A1 Sep. 30, 2010

(51) Int. Cl.
*G06F 17/30* (2006.01)

(52) U.S. Cl.
CPC ... *G06F 17/30867* (2013.01); *G06F 17/30029* (2013.01)

(58) Field of Classification Search
CPC ................................................ G06F 17/30029
USPC ...................................................... 707/733
See application file for complete search history.

(56) References Cited

U.S. PATENT DOCUMENTS

| | | | |
|---|---|---|---|
| 6,006,225 A * | 12/1999 | Bowman et al. | |
| 6,850,934 B2 * | 2/2005 | Bates et al. | |
| 7,072,888 B1 * | 7/2006 | Perkins | 707/733 |
| 7,089,236 B1 * | 8/2006 | Stibel | |
| 7,693,827 B2 * | 4/2010 | Zamir et al. | 707/999.003 |
| 2008/0208844 A1 * | 8/2008 | Jenkins | 707/5 |
| 2009/0019002 A1 * | 1/2009 | Boulis | 707/3 |
| 2009/0307168 A1 * | 12/2009 | Bockius et al. | 706/46 |
| 2010/0293057 A1 * | 11/2010 | Haveliwala et al. | 705/14.66 |

* cited by examiner

*Primary Examiner* — Grace Park
(74) *Attorney, Agent, or Firm* — James J. DeCarlo; Greenberg Traurig LLP (57) ABSTRACT

The present invention provides a method and system for conducting a profile based search. The method and system includes receiving a search request including one or more search terms from a user, parsing the search request into categorical verticals, determining search refinement data relative to the categorical verticals, the search refinement data including at least one of: profile information, environmental data relative to the search request and historical behavior data relating to the search request or the user and accessing a database of aggregated search data based on the search refinement data. The method and system includes using the aggregated search data, determining a most relevant search query and a most relevant user profile, refining the search request based on the most relevant search query and most relevant user profile and generating an output display of a search result set based on the refined search request.

20 Claims, 5 Drawing Sheets

SYSTEM AND METHOD FOR CONDUCTING A PROFILE BASED SEARCH

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates generally to Internet search engine technology and more specifically to refining and adjusting search operation results based on profile information.

The Internet provides a large collection of interlinked content items in various formats, including documents, images, video and other media content. While the growth of the Internet increases the availability of content items, it also impairs the ability of users to search this massive collection and identify content items relevant or responsive to a given query. The vast number of content items available on the Internet also leads to frustration on the part of users attempting to locate relevant information.

Early search engine technology returned search results from a network, e.g. the Internet, without regard to an intended audience. The evolution of search engine technologies started with the recognition of content categories, sometimes referred to as "verticals." Given a corpus of content, a category is a subset of content items that satisfy some criteria associated with one or more content items. For example, one category regularly recognized by popular search engines is the "local" category, which consists of content associated with a given geographic area, such as New York, San Francisco or London.

Search engines increasingly permit users to specify, in addition to a set of query terms, a specific category in which the user would like to conduct a search for content. The categories offered to the user for selection often include, for example, "video," "images," "local," "shopping," "answers," "audio," "directory," "jobs," and "news." Although categories may help users narrow the set of content items for conducting a search, this does not reduce the confusion associated with the large degree of content.

The underlying information for harnessing the collective knowledge of individual users with specific interests remains hidden in disparate data sets across multiple platforms. For example, a user who happens to be a world-class surfer living in California registers with a search engine and permits the search engine to monitor and track online activities. Current search engine technologies, however, fail to harness this data to users who would benefit from it, e.g. those who want to start surfing.

Search technologies are overly concerned with what a person is looking for and therefore only give minimal consideration to whom is looking. Accordingly, there exists a need for systems, methods and computer program products for conducting a profile based search.

SUMMARY OF THE INVENTION

The present invention provides a method and system for conducting a profile based search. The method and system includes receiving a search request including one or more search terms from a user, parsing the search request into categorical verticals, determining search refinement data relative to the categorical verticals, the search refinement data including at least one of: profile information, environmental data relative to the search request and historical behavior data relating to the search request or the user and accessing a database of aggregated search data based on the search refinement data. The method and system includes using the aggregated search data, determining a most relevant search query and a most relevant user profile, refining the search request based on the most relevant search query and most relevant user profile and generating an output display of a search result set based on the refined search request. As such, search operations are refined using categorical verticals and additional profile or related information.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

In the following description, reference is made to the accompanying drawings that form a part hereof, and is shown by way of illustration specific embodiments in which the invention may be practiced. It is to be understood that other embodiments may be utilized and structural changes may be made without departing from the scope of the present invention.

Figure 1:
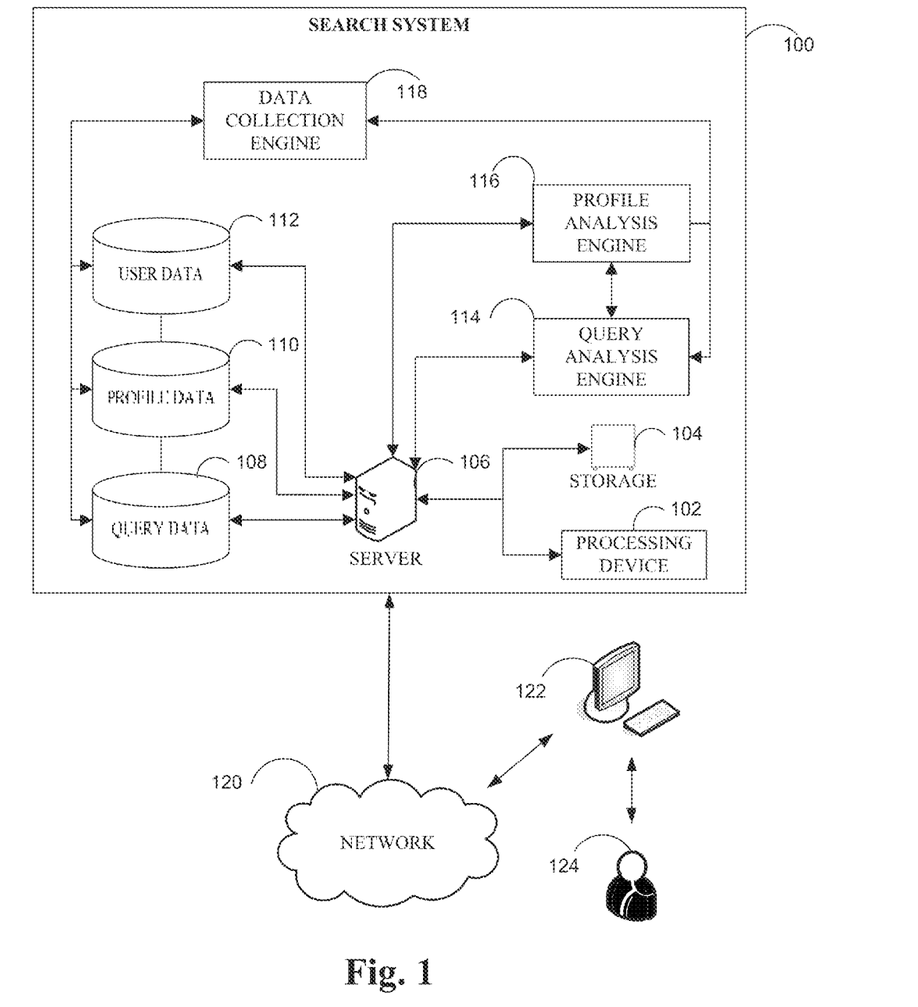
FIG. 1 illustrates a block diagram depicting a system for conducting a profile based search according to one embodiment of the present invention.

FIG. 1 illustrates a search system 100 that includes a server 106, a processing device 102, a storage device 104, a query data store 108, a profile data store 110, a user data store 112, a query analysis engine 114, a profile analysis engine 116 and a data collection engine 118. The search system 100 is connected to a network 120, which places the server 106 in communication with a user 124 via an output display 122.

In the search system 100, the server 106 may be any suitable type of server utilizing known search engine technology as recognized by one skilled in the art, including the receipt of a user request, processing the request and generating search result operations. The processing device 102 may be any suitable type of processing device operative to perform processing operations as described in further detail below. The storage device 104 may be a computer readable medium or any suitable type of physical device capable of having the executable instructions 112 stored thereon, for example the storage device 104 may be internal memory within a computing system, or in another example the storage device 104 may be an optical disc having the instructions stored thereon. It is recognized that the examples of internal memory and an optical disc are exemplary in nature and are not limiting as to the storage device 104.

The data stores 108, 110 and 112 may be any number of data storage devices having search information stored thereon, such as for example information about web-based content (e.g. URLs and a description) and profile information to be placed in a search results page. The network 120 may be any suitable type of networking interconnection allowing for networked communication, e.g. the Internet. The output display 122 may be any suitable type of remote or networked processing device and is not limited to the illustrated computer, but may also include any mobile device, and more generally relates to any processing device operative to communicate with the search system 100 via a networked connection, e.g. the network 120.

The query analysis engine 114 may be operative to examine input received from the user 124. The profile analysis 116 engine may be operative to analyze information associated with one or more profiles. The data collection engine 118 may be operative to create, track, maintain and collect profiles as well as information associated with a user profile, a search profile and a query profile.

As described in further detail below, a profile may be a record or document representing a user 124. In some embodiments, a profile may represent each user or it may represent a group of users 124. When a user 124 executes a query, an association between query terms and the user's profile class may be stored by the data collection engine 118 across the various data stores 108, 110, and 112 of the search system 100 or on any accessible data storage device. The associations stored by the data collection engine 118 establish a contextual relationship between search terms or search operations in the queries entered by users 124 and classes of users, such as in one embodiment the classes noted based on the user profile characteristics.

In one embodiment, the creation of a profile occurs when a user 124 registers with the search system 100. To setup a profile, a user 124 may enter information ranging from the user's biography to the user's preferences. The search system 100 may use the information entered for determining comparable search profiles for the user 124 and utilizing profile information of similar users. In another embodiment, the search system may track user search behavior and develop the user profile over time, for example when the user is logged into the system and the system is able to track the user behavior. In this regard, the search system 100 may be operative to collect user session data as well as the contextual data existing at the time the user 124 conducts a search.

In yet another embodiment, the search system 100 presents the user 124 with an interface where the user 124 may select from a set of public profiles or profile templates. As noted in additional embodiments described below, the profile may be a general category of users (e.g. male, age 20-30, etc.) or could be a specific profile having specific characteristic (e.g., a famous person).

In another embodiment described in further detail below, the search system 100 may also allow advertisers to set economic terms on customized or predefined user search profiles, allowing for monetization of the profile and subsequent refined search results. Pre-set template profiles may be sold to advertisers for customization and deployment in the market and for market research. For example, branded or otherwise sponsored search profiles may be attribute significant weight to a particular product or family of products of the underlying sponsor or brand.

In the search system 100, the server 106 may be operative to perform numerous searching operations, such as for the user 124. While operating in accordance with known search engine techniques, the data collection engine 118 monitors the search engine activity, recording the activity. The activity may include not only the user search operations themselves, but also user actions after a search is completed, such as tracking which search results the user 124 selects, or for example, if the user 124 enters a new search to supplement the original search. Therefore, through the data collection engine 118, the search system 100 includes a large collection of session information for any number of users using the search system 100. It is noted that in FIG. 1, data collection engine 118 is illustrated to be in communication with the server 106 in an indirection fashion via the engines 114, 116 and databases 108, 110, 112, which is for illustration purposes only and it is recognized that the data collection engine 118 may communicate directly with the server 106.

A given profile may contain a user's session information, background information, interests, previous searches, current location, and associations with social networks. In embodiments where the profile represents more than one user, the profile may comprise a user type. For example, a user type may be a general characterization, e.g., a surfer, a musician, a movie critic, a hipster or a professional. In addition, a given user 124 may indicate a user type when registering with the search system 100 by entering profile information in a form, see for example FIG. 5 discussed below.

Figure 2:
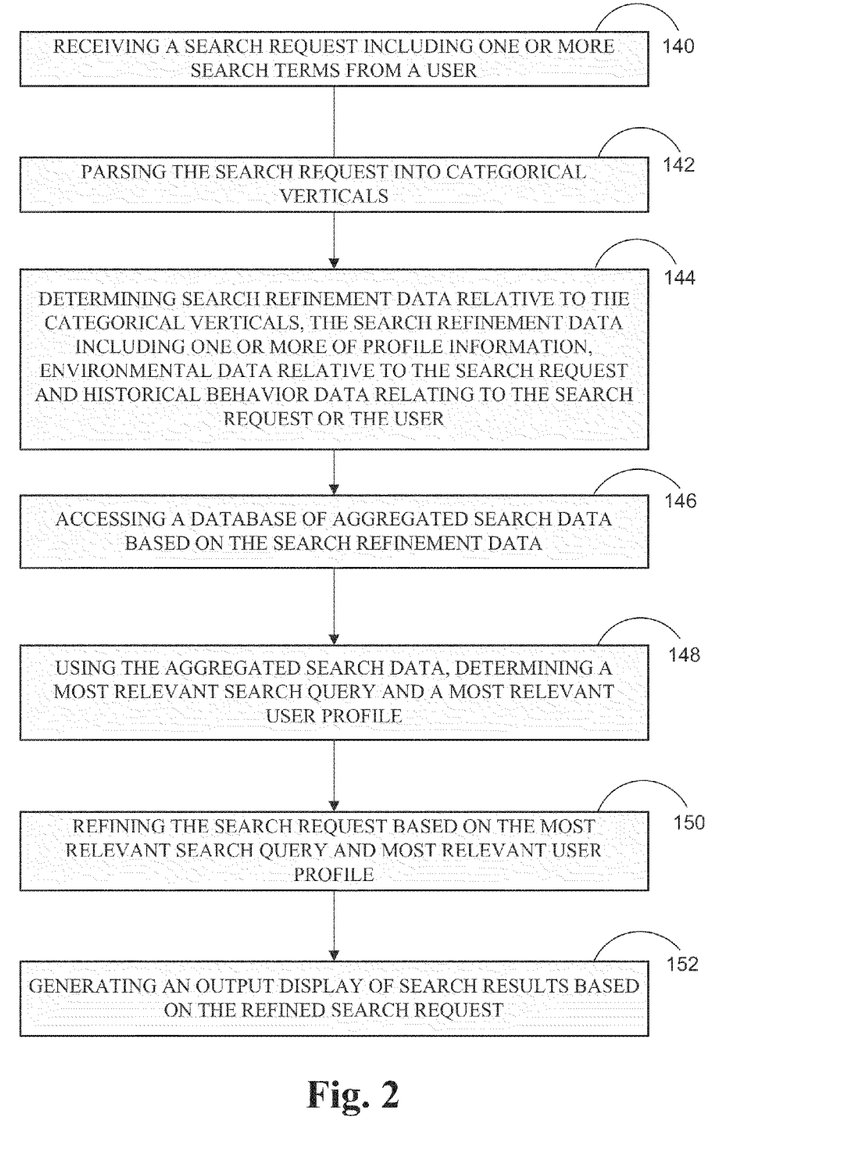
FIG. 2 illustrates a flow diagram illustrating a method for conducting a profile based search according to one embodiment of the present invention.

For the sake of brevity, one embodiment of the operations of the search system 100 of FIG. 1 are described with reference to the flowchart of FIG. 2. FIG. 2 illustrates one embodiment of a method for conducting a profile based search, where the method may be performed within the system 100 of FIG. 1.

As FIG. 2 illustrates, in one embodiment, a first step is receiving a search request including one or more search terms from a user. Relative back to FIG. 1, the data collection engine 118 may be operative in capturing explicit search queries and trajectory search queries. An explicit search query may comprise text input received from a user 124 on the search system 100. A trajectory captures the context under which a user enters a search query and may comprise a user profile, a temporal profile (e.g. a set of queries entered during the holiday seasons and the frequency of a set of queries over a period of time), spatial profiles (e.g. a set of queries entered by users at a given IP address or GPS location) or social profile (e.g. a set of queries entered by users looking for social events or gatherings like concerts and conventions.)

The data collection engine 118 may be further operative to collect trajectory user profile information. The collection of trajectory user profile information may also be explicit or implicit. For example, the user 124 may explicitly define what type of information the search system 100 may collect. In addition, an unrestricted search system 100 may implicitly collect user profile information such as location information by virtue of an IP address. In one embodiment, the data collection engine 118 may be further operative to collect click-throughs on search assist suggestions, search recommendations and search results. In other embodiments, the data collection engine 118 may be operative to collect the input query from various interface models. For example, the data collection engine 118 may collect the queries entered and the search results selected from videogame type search interfaces. Over time, data collection engine 118 may map the collected data to relevancy graphs and prioritize the queries and data based on a different query and contextual categories.

As described above, the data collection engine performs operations relative to the collection and tracking of information from user activity, as well as the ancillary data relating to the search request. Although, relative to the step 140, this step may be performed by the server 106 receiving the search request from the user 124 via the computer 122 through the network 120. The search request may be presented from a search interface, such as for example a web browser search interface. The search system 100 may then parse the query string and send some or all of the parsed query string to the engines 114, 116 and 118 of FIG. 1

A next step, step 142, is parsing the search request into categorical verticals. The categorical verticals may be based on additional inquiry into the search request itself, such as the who, what, when and where of the search. As is known in the art, the categorical verticals include differentiated search information usable for providing more explicit or more directed search results.

A next step, step 144, is determining search refinement data relative to the categorical verticals, the search refinement data including one or more of (1) profile information, (2) environmental data relative to the search request; and (3) historical behavior data relating to the search request or the user. As described in detail above, the profile information may include user-entered information, tracked information, or any other suitable information acquired in any suitable manner that indicates a particular profile. It is noted that the profile information is not necessarily the profile information of the user, but the profiles may relate to general user characterizations or could in another embodiment be the profile of someone who is not the user. The environmental data may include the trajectory information, e.g. the context under which the query is being submitted, a temporal profile, e.g. searches done during a particular holiday season, spatial profiles, e.g. what users look for at a given IP address, GPS location, e.g. from a mobile device, event/social profiles, e.g. what users look for at a given event such as a concert of social gathering. The historical behavior data may indicate tracked behavioral data relating to other searches performed using the search request or related search requests, or in another embodiment may relate to the historical behavior relating to the user.

The next step, step 146, is accessing a database of aggregated search data based on the search refinement data. With respect to FIG. 1, this may include accessing the data collection engine that collects the aggregated search data and the engine 118 may be accessed relative to calculations performed by the profile analysis engine 116 and the query analysis engine 114.

A next step, step 148, is determining a most relevant search query and a most relevant user profile using the aggregated search data. Various embodiments are within the present method and system, including for example the most relevant search query being the user-selected search query and a most relevant user profile may be the user-selected profile. In additional embodiments, known relevancy routines may be utilized to determine, which may include suggesting to the user, what is deemed a most relevant search query. In additional embodiments, the most relevant user profile may be an automatically selected profile based on ancillary data, e.g. trajectory data, historical data, user profile data, etc.

A next step, step 150, is refining the search request based on the most relevant search query and the most relevant user profile. Different embodiments may be utilized for refinement. For example, one embodiment may include refining a search request prior to conducting a search operation. Another embodiment may include refining or prioritizing the search result operations when a search has been completed. Another embodiment may include the refinement being performed automatically without user intervention prior to conducting a search operation.

When a user 124 executes a search, the search system 100 may return a set of documents relevant to the user's query. Weighting and aggregating each returned document against a larger set of specified profiles may determine the rank ordering of these results. The relevance of any given document to the set of profiles may be given by the aggregated relevance of that document to each of the individual profiles.

For example, a profile p may represent a user's background, previous searches, current location and social network. When a user 124 executes a search, the search system 100 may match the query string and user's profile against a set of documents, ranking them in decreasing order of relevance. The relevance of a given document $d_i$ to a given query q for user profile $p_j$ may be expressed as $r_{i,j}=R(q, p_j, d_i)$.

In addition, the user may be able to specify a set of profiles $P=\{p_1, \ldots, p_n\}$ in the context of which to execute their query. According to one embodiment, the profile analysis engine 116 of FIG. 1 receives a set of profile weights $W=\{w_1, \ldots, w_n\}$ corresponding to the weight of all profiles to the given user for the given query. $0 \le w_i \le 1$. With this set, the relevance of a document $d_i$ to a query q in the context of set of profiles P may be given as, $$r_i = \sum_{j=1}^{n} w_j \cdot R(q, p_j, d_i). \quad \text{Equation 1}$$

A person of skill in the art will recognize the availability of other algorithms for determining the relevancy of a profile. The omission of these other algorithms is for purposes of clarity only.

In step 152, the method illustrated in FIG. 2 uses the query and the profile information to generate an output display of a search result set based on the refined search request such as to return a set of profile-based search results. Search results may comprise search assist suggestions, vertical suggestions, search recommendations or a listing of search result pages. In one embodiment, the search system of FIG. 1 may be operative to a return a listing of search results to the user 124 via the output display 122. In an alternative embodiment, the search system 100 may be operative to surface search assist suggestions or recommendations in a search interface to the user 124 via the output display. In addition, other more graphical and visually intuitive approaches for generating the output display will be recognized by those of skill in the art. Thereupon, in the embodiment illustrated in FIG. 2, the method is complete.

As noted above, one embodiment may include refining the search request prior to conducting the search operation. For example, this may include performing the above-describe processing operations and then presenting the user with a list of suggested search terms. For example, the search terms may appear in a "suggested search terms" display within the interface itself, e.g. as the user is typing, or may be in a secondary or intermediate interface display allowing for the user to select one or more alternative search queries. In the refinement prior to conducting the search, the selection of recommendations may provide for replacing the search terms of the search request with recommended search terms.

The present system and method may provide for multi-profile based query term assistance. The search query terms and phrases from various users are clustered based on the co-occurrence, i.e. these search terms are similar because they appear together in many documents and searched together by many users. For example, the terms "Onsen" and "Hot Springs" may be clustered together because they often appear together in documents describing hot springs. The clusters represent regions of high-semantic similarity in a globally aggregated sense.

Various users are represented by a profile and a profile may represent more than one user. When the user executes queries, the association between query terms and the user's profile class are stored, establishing a contextual relationship between particular search terms and general classes of users. When a user enters a query, the associated clusters for the search terms in the query are retrieved from the cluster index. The associations of query terms to user profiles are examined to find alternative query terms which are relevant to a set of user profiles other than the user's primary profile that either the system or user has specified.

As noted above, another embodiment may include the refinement performed after the search operation is performed. The refinement may include sorting and selecting the most relevant search results based on the most relevant search query and the most relevant user profile, such as determined as discussed above.

Another embodiment includes when the search refinement data includes profile information, the methodology includes accessing a plurality of user profiles, each profile including profile information stored therein. As discussed above, this profile information may be stored in the profile data database 110. The method includes selecting one of the user profiles as the most relevant user profile for refining the search. As discussed in additional detail below regarding additional embodiment, a display and the selection of a profile allows for a much greater degree in flexibility and options for profile based search operations. For example, the profile may be a famous person profile based on information associated with the famous person, e.g. what would Albert Einstein's search look like. Another example may be a characterization or categorical listing, for example what would a search look like for a 25 year old male, born in California who likes surfing and action movies. By presentation of options and user selection, the profile based searching can produce different results each time.

Another aspect of the system and method allows for additional tracking of the search operations and subsequent features upon completion of the search. The tracking of this information includes tracking what the user does with the search results, which links are followed, if additional searches are performed, etc. In this system, tracking of the information of the system operations before and after the search results are generated may be used to update profile information, improving further searching operations.

Figure 3:
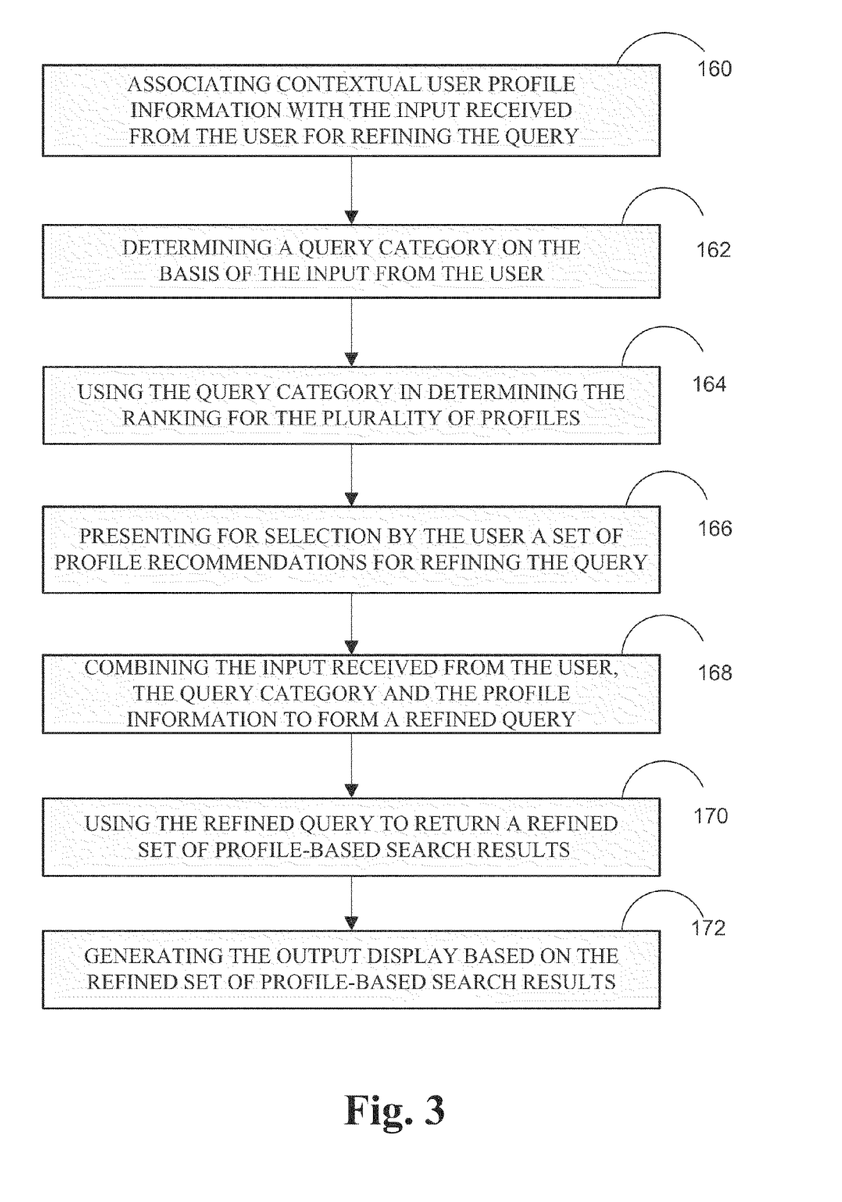
FIG. 3 illustrates a flow diagram illustrating a method for conducting a profile based search according to one embodiment of the present invention.

FIG. 3 presents a flow diagram illustrating a method for conducting a profile based search according to another embodiment of the present invention. The first step of the method illustrated in FIG. 3 is step 160, associating contextual user profile information with the input received from the user for refining the query. Contextual data may generally include a set of data of temporal, spatial, activity, social, movement and geographic data on users from data recorded by the search system 100 of FIG. 1 or manually entered by the user 124 via the output display 122.

For example, a given user submits a search query via her mobile device on the term, "Hot Springs Tokyo." The search system 100 may parse the search query as ("Hot Springs") ("Tokyo"), categorizing the terms into entity and location. The categorization may then be used by the profile analysis engine 116 in determining the relevancy of the query with user search profiles. In this regard, the profile analysis engine 116 may retrieve for further processing the available data from other search queries related to hot springs within the Tokyo-relevant user pool.

With the relevant user profile pool established, the search system 100 may be able to discern the locosemantic, idioms, or slang terms used by the user pool. In this case, the search system 100 recognizes that most Tokyo-relevant search querors use the term "Onsen" to come up with better search results. With this information, the search system 100 may surface the "Onsen" term to the user as a search assist recommendation. In another embodiment, the search system 100 may automatically incorporate the term "Onsen" in executing the search query on the server 106. In addition, the search system 100 may determine the current location of the user is Harajuku, Tokyo, the current season is winter and it is currently 2 pm in Tokyo. The search system 100 may prioritize or add weight to documents indicating that an "Onsen" popular in winter, an "Onsen" open past 2 pm, an "Onsen" in the vicinity of Harajuku and return search results accordingly.

The next steps in the method of FIG. 3 are determining a query category on the basis of the input from the user, step 162 and using the query category in determining the ranking for the plurality of profiles, step 164. One embodiment of a method for determining a query category is described in co-pending U.S. patent application Ser. No. 11/881,503, entitled "QUERY CATEGORIZER."

In another embodiment, determining a query category may include the clustering of query terms. Relative back to FIG. 1, the query analysis engine 114 may be operative to cluster or otherwise group search query terms and phrases, executed from a set of users based on the co-occurrence of terms across a set of documents. For example, the query analysis engine may cluster the search terms "Onsen" and "Hot Springs" together because they often appear together in documents describing hot springs. In this regard, the clusters represent regions of high-semantic similarity in a globally aggregated sense. In yet another embodiment, the query analysis engine 114 may retrieve the associated clusters for the search terms in the query from a cluster index maintained on the search system of FIG. 1. The associations of query terms to user profiles may also be examined to find alternate query terms to a set of user profiles other than the user's primary profile, which may be specified, by the search system 100 or the user 124.

The next step of the method illustrated in FIG. 3 is presenting for selection by the user a set of profile recommendations for refining the query, step 166. Relative back to FIG. 1, the search system 100 may present an interface for the user to manually select multiple predefined, comparable and/or divergent query profiles for refining the query. In an alternative embodiment, the interface may present the user 124 with the option to pre-set search profiles that are recommended by the search system 100 or manually created by the user 124 during each search query. In addition, the user 124 may opt to have the pre-set profiles run on every search where they act as a permanent filter. In one embodiment, a pulldown menu or some other graphical user interface object allowing the user 124 to select a series of divergent and/or comparable search profiles may accompany a search query box.

In other embodiments, the search system 100 automatically determines a query profile based on query, user profile and the users' temporal, spatial and social data at the time of the search for refining the query. For example, the search system 100 may select from a list of system-generated recommended profiles for the user 124 based on the user preferences, search behavior, and query profile. Without limitation, the list of system-generated recommended profiles may also be presented to the user 124 for selection.

The remaining steps of the method illustrated in FIG. 3 include combining the input received from the user, the query category and the profile information to form a refined query, step 168; using the refined query to return a refined set of profile-based search results, step 170 and generating the output display based on the refined set of profile-based search results, step 172. In one embodiment, the search system 100 parses search queries by vertical segment categories and combines the categorized query with user profile, temporal, spatial, social data to surface the search results. By combining the query vertical segment data with user search profiles, the search system 100 may be operative to filter or refine search assist and search query results by surfacing query subject matter expert type advice. Upon selection, the search system 100 may be operative to filter or re-rank the original search results. Thereupon, in the embodiment illustrated in FIG. 3, the method is complete.

Figure 4:
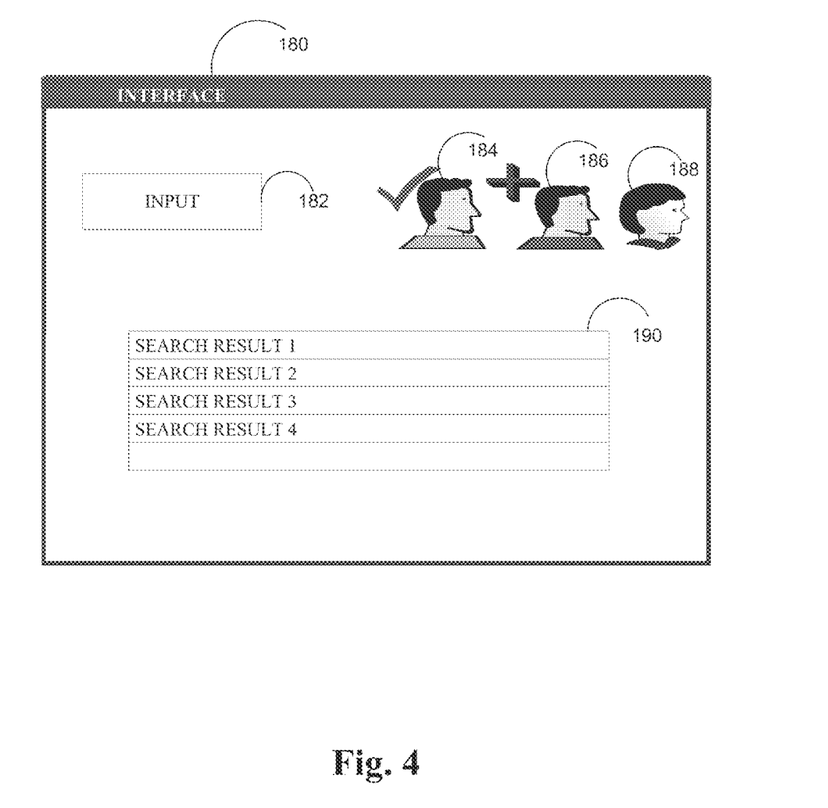
FIG. 4 illustrates a sample output display as generated by the system and method for conducting a profile based search.

FIG. 4 illustrates a sample output display as generated by the system and method for conducting a profile based search. The sample output display of FIG. 4 includes an interface 180, search box 182, a first profile 184, a second profile 186, a third profile 188 and a set of search results 190. In other embodiments, the graphical representations of profiles 184, 186, and 188 may indicate additional information, such as but not limited to, a user type, a user personality, a user's hobbies or interests, a user's professional affiliation, a user's favorite sports team, a user's mood, a user's current location or an amalgamation thereof.

Relative back to FIG. 1, the sample output display may be generated by the search system 100 for presentation to a user 124 on the output display 122. Prior to display, the search system receives input forming a query from the user 124; determines a ranking for a plurality of profiles 184, 186 and 188; selects profile information (as indicated by the check in profile 182); and uses the query and the profile information to return a set of profile-based search results 190 on the output display 122 relative to the user 124. As such, the sample output display of FIG. 4 illustrates a representative display with profiles presented to a user based on the query and associated profile information.

FIG. 4 provides a sample interface 180 display of any number of possible embodiments providing for profile based searching. For example, search input 182 may be analyzed by the query term assistant technique described above such that as the user is entering the search request, recommended terms are added.

In the interface 180, the profiles 184, 186 and 188 (collectively referred to as 184-188) may represent various degrees of profiles that can be used to augment or supplement a search operation. For example, the profiles 184-188 could be different possible profile types such that a user selection of one of the profile changes the profile information used in refining the search operation. In this embodiment, the profiles may represent different possible profiles associated with the user.

Another embodiment utilizes a classification, referred to as a search posse, to represent a possible grouping of various profiles. The profiles may represent a general characterization and associated settings or attributes associated therewith. For example, one profile may be a college student, another profile is a child and a third profile is a rock star, merely by way of example. It is recognized that this embodiment allows for generalized characterizations and assumptions regarding profiles, in effect providing stereotypical information associated to profiles. It is noted that the illustrated embodiment displays three profile options, this is for illustration purposes only and it is recognized that any suitable number of possible profile options may be displayed and/or presented to the user.

Another embodiment may include the profiles 184-188 being attributed to a specific individual, for example a celebrity. By way of example, supposed that the profile 184 was for the basketball player Michael Jordan, the second profile was for the signer Madonna and the third profile is for the business service Hoovers. These profile based searches allows the user to conduct a search query and receive search results 190 that may be of directed interest to the associated profile. It is noted that the illustrated embodiment displays three profile options, this is for illustration purposes only and it is recognized that any suitable number of possible profile options may be displayed and/or presented to the user.

It is also recognized that the profile based search refinement could also be refined after a search has been conducted and the results 190 are displayed. For example, upon user selection of a different profile 184-188, the results 190 may be re-ordered in accordance with the profile based searching noted above, where the profile information is updated to reflect the updated profile selection. In this embodiment, an example might be a search for the term "anime movies," and different search result displays can be envisioned. For example, a first type may be a search result based on the user profile and behavior tracking information as described above. Another example may be a second type with the search results for anime movies ordered by someone else as selected by the user (e.g. selecting one of the profiles 184-188). Another example may be a third type with the search results based on a subject-matter expert as determined from the profile information database.

Figure 5:
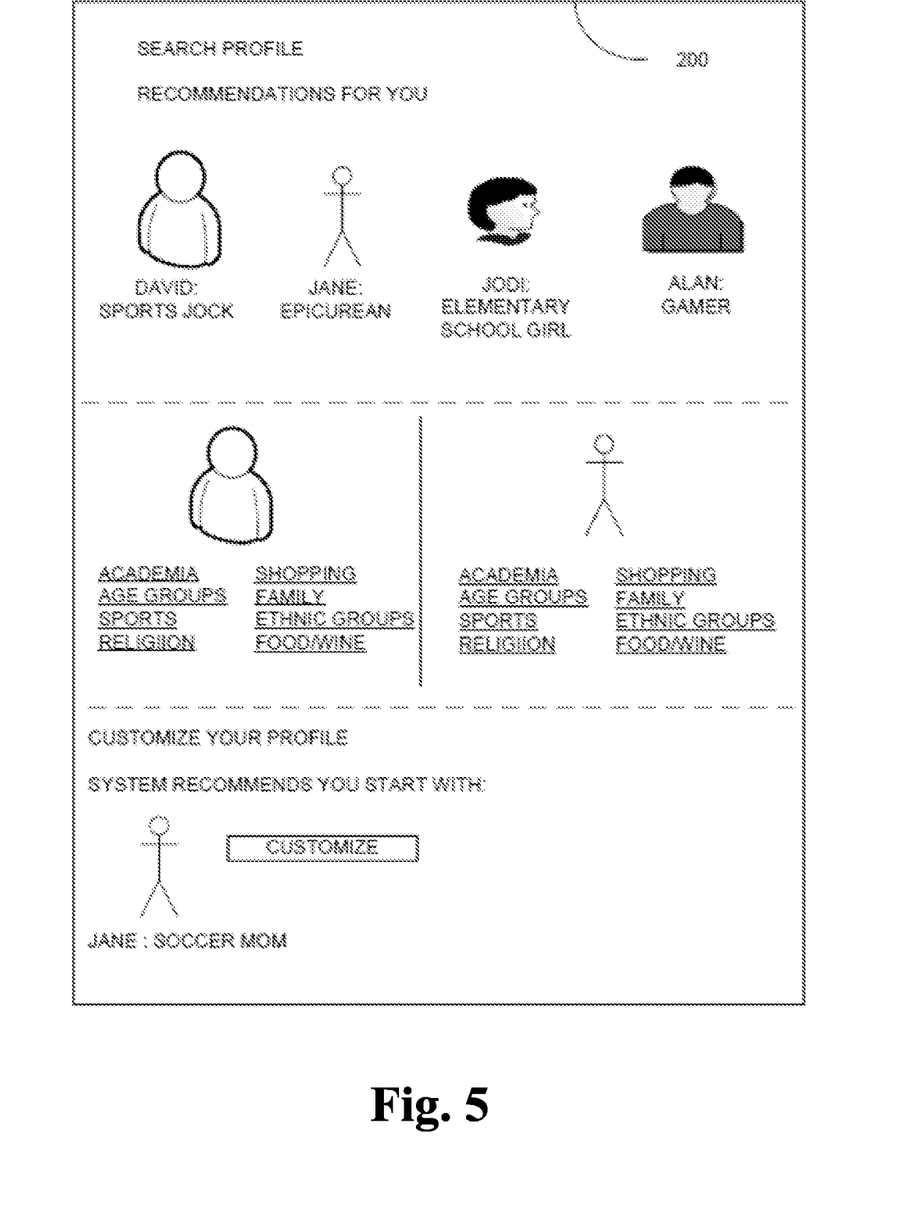
FIG. 5 illustrates a sample interface display for profile selection or generation.

FIG. 5 illustrates a sample display 200 providing for profile information. The user may manually elect predefined, comparable or divergent query profiles to filter search results and get search assist/query recommendations. As illustrated in the sample display 200, the user may be presented with profile recommendations, such as being based on tracking of user activity, user preferences, search behavior and/or query profile. The user may also be presented with ah list of generic public profiles listed by query categories, such as the second tier in the sample display. In another embodiment, the user may generate and customize a profile, giving the profile a name and then use that profile for the search. For example, if the user conducts different searches for different purposes, the user may adjust profiles, e.g. if the person conducts a search for a place to dine while at work versus on personal time, the user may be seeking completely different types of results and that information can be accommodated based on the different profile selection options.

There are additional possible embodiments available relative to the described profile based searching. In one embodiment, a series of predefined profiles can be augmented over time by search behavior tracking over time of users that closely match the profiles. The profiles can be manually predetermined by system operators and augmented automatically by the system or manually updated by users who relevant to the profile.

In one embodiment, public profile augmenters may require membership that requires authentication before a public profile can be changed. In another embodiment, these predetermined profiles can serve as a profile template for the users to use and customize for private utility.

Another embodiment of predefined profiles allows users to select profiles based on searching based on task types. The user can select a series of pre-determined task-based search profiles as an ongoing or one-time search posse to assist the user in search assist recommendations and/or search result refinements. One example may be the Hoovers profile described above.

In another embodiment, the system may include a series of predefined profiles that are categorized by search query brand types. For example, in a monetization embodiment, Hoover Research Institute can arrange for a lease/rent Hoover search profile. This profile acts as a Hoover predefined search filter for all queries conducted by the user. For example, when the user does a search query for Yahoo with the Hoover search profile, the results will immediately be on Yahoo! company related results.

Users can also elect to manually browse and pick any profile types. For example, the system may make recommendations and/or closely match the user's explicit or implicit profile. The user can enter profile or preferences for profile types and the system surfaces closely matched profiles. The system may perform comparable profile matching based on user data in the background and surface comparable profiles to the user.

In another embodiment, the user may be interested in divergent or opposite profiles. The user may manually browser divergent profiles that are randomly selected by the system based on lower or lowest relevancy algorithms. In another embodiment the user can manually select divergent profiles based on the user's own search or exploration of various profiles.

In another embodiment relating to monetization, preset templates can be associated with commercial interests. For example, supposed a sponsor purchases a profile such that when a search is performed, all search results are prioritized relative to the sponsor. By way of example, suppose a soft drink manufacturer purchased a profile and when a search is conducted, the results are prioritized towards the sponsors products, e.g. if the user conducts a search towards athletics, the results may include information to sports drinks or sponsored activities. In other embodiment for monetization, the system operator may have pre-set templates that can be sold or rented out to advertisers for advertisers or marketers to customize and sell or conduct market research.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

We claim:

1. A method comprising:
   receiving, by a computing device, a search query including one or more search terms from a user;
   generating, based upon the one or more search terms and from tracked user search behavior, by the computing device, a user profile for the user in a data store comprising a plurality of user profiles;
   establishing, by the computing device, a contextual relationship between the one or more search terms and user profile characteristics associated with each user profile of the plurality of user profiles;
   parsing, by the computing device, the search query into categorical verticals;
   determining, by the computing device, search refinement data relative to the categorical verticals, the search refinement data including at least one of: profile information, environmental data relative to the search query and historical behavior data relating to other search queries;
   accessing, by the computing device, a database of aggregated search data based on the search refinement data, the search data comprising a plurality of query terms and the plurality of user profiles;
   determining, by the computing device, alternative query terms in the plurality of query terms, the alternative query terms relevant to a set of user profiles in the plurality other than a user's primary profile selected by the user;
   determining, by the computing device, a most relevant search query from the plurality of search queries and the alternative query terms and a most relevant user profile from the plurality of user profiles, the most relevant user profile based on a plurality of sponsor-purchased public user profiles and both the most relevant search query and the most relevant user profile based on the aggregated search data;
   refining, by the computing device, the search query based on the most relevant search query and most relevant user profile; and
   generating, by the computing device, an output display including a search result set based on the refined search query.

2. The method of claim 1 further comprising:
   refining the search query by displaying a plurality of search adjustment recommendations including recommended search terms; and
   upon user selection of one or more of the search adjustment recommendations, replacing the search terms of the search query with the recommended search terms.

3. The method of claim 1 further comprising:
   conducting a search operation based on the search query; and
   refining the search query by sorting and selecting the most relevant search results based on the most relevant search query and most relevant user profile.

4. The method of claim 1, wherein the environmental data relative to the search query includes temporal data, spatial data and social data.

5. The method of claim 1, wherein the profile information includes at least one of: a query profile, a search profile and a user profile.

6. The method of claim 1, wherein the search refinement data includes profile information, the method further comprising:
   accessing the plurality of user profiles, each profile including profile information stored therein; and
   selecting one of the user profiles as the most relevant user profile for refining the search query.

7. The method of claim 6 further comprising:
   transmitting an interface to the user to enable the user to select one or more user profiles including an indication to whom the profile is associated; and
   receiving a user selection command of one of the user profiles for refinement of the search query based on the selected user profile.

8. The method of claim 1, wherein the refining of the search query is automatically performed prior to conducting a search operation.

9. The method of claim 1 further comprising:
   tracking processing operations by the user before and after the generation of the output display; and
   updating profile information based on the tracking operations.

10. The method of claim 1 wherein the determination of the search refinement data is based on the profile information, the method further comprising:
    associating a sponsored interest with the profile; and
    refining the search query based on the profile including limiting the search results solely to results associated with the sponsored interest.

11. A system comprising:
    a processor;
    a storage medium for tangibly storing thereon program logic for execution by the processor, the program logic comprising:
    search query receiving logic executed by the processor for receiving a search query including one or more search terms from a user;
    generating logic executed by the processor for generating, based upon the one or more search terms and from tracked user search behavior, a user profile for the user in a data store comprising a plurality of user profiles;
    relationship establishing logic executed by the processor for establishing a contextual relationship between the one or more search terms and user profile characteristics associated with each user profile of the plurality of user profiles;
    parsing logic executed by the processor for parsing the search query into categorical verticals;
    search refinement data determining logic executed by the processor for determining search refinement data relative to the categorical verticals, the search refinement data including at least one of: profile information, environmental data relative to the search query and historical behavior data relating to other search queries;
    aggregated search data accessing logic executed by the processor for accessing a database of aggregated search data based on the search refinement data, the search data comprising a plurality of query terms and the plurality of user profiles;
    alternative query term determining logic executed by the processor for determining alternative query terms in the plurality of query terms, the alternative query terms relevant to a set of user profiles in the plurality other than a user's primary profile selected by the user;
    relevant search query and profile determining logic executed by the processor for determining a most relevant search query from the plurality of search queries and the alternative search query terms and a most relevant user profile from the plurality of user profiles, the most relevant user profile based on a plurality of sponsor-purchased public user profiles and both the most relevant search query and the most relevant user profile based on the aggregated search data, refining logic executed by the processor for refining the search query based on the most relevant search query and most relevant user profile; and output display generating logic executed by the processor for generating an output display including a search result set based on the refined search query.

12. The system of claim 11, wherein the refining logic is further configured to:

refine the search query by displaying a plurality of search adjustment recommendations including recommended search terms; and upon user selection of one or more of the search adjustment recommendations, replace the search terms of the search query with the recommended search terms.

13. The system of claim 11, wherein the refining logic is further configured to:

conduct a search operation based on the search query; and refine the search query by sorting and selecting the most relevant search results based on the most relevant search query and most relevant user profile.

14. The system of claim 11, wherein environmental data relative to the search query includes temporal data, spatial data and social data.

15. The system of claim 11, wherein the search refinement data includes the profile information, the profile information including at least one of: a query profile, a search profile and a user profile.

16. The system of claim 11, further comprising:

interface transmitting logic executed by the processor for transmitting an interface to the user to enable the user to select one or more user profiles including an indication to whom the profile is associated; and user profile receiving logic executed by the processor for receiving user selection command of one of the user profiles for refinement of the search query based on the selected user profile.

17. The system of claim 11, wherein the refining of the search query is automatically performed prior to conducting a search operation.

18. The system of claim 11, further comprising:

tracking logic executed by the processor for tracking processing operations by the user before and after the generation of the output display; and profile updating logic executed by the processor for updating profile information based on the tracking operations.

19. The system of claim 11 wherein the determination of the search refinement data is based on profile information, and further comprising:

interest associating logic executed by the processor for associating sponsored interest with the profile; and interest refining logic executed by the processor for refining the search query based on the profile including limiting the search results solely to results associated with the sponsored interest.

20. A non-transitory computer readable storage medium having executable instructions stored thereon such that when the instructions are executed by a processing device, the processing device enables:

receiving a search query including one or more search terms from a user;

generating, based upon the one or more search terms and from tracked user search behavior, a user profile for the user in a data store comprising a plurality of user profiles;

establishing a contextual relationship between the one or more search terms and user profile characteristics associated with each user profile of the plurality of user profiles;

parsing the search query into categorical verticals;

determining search refinement data relative to the categorical verticals, the search refinement data including at least one of: profile information, environmental data relative to the search query and historical behavior data relating to other search queries;

accessing a database of aggregated search data based on the search refinement data, the search data comprising a plurality of query terms and the plurality of user profiles;

determining alternative query terms in the plurality of query terms, the alternative query terms relevant to a set of user profiles in the plurality other than a user's primary profile selected by the user;

determining a most relevant search query from the plurality of search queries and the alternative query terms and a most relevant user profile from the plurality of user profiles, the most relevant user profile based on a plurality of sponsor-purchased public user profiles and both the most relevant search query and the most relevant user profile based on the aggregated search data;

refining the search query based on the most relevant search query and most relevant user profile; and generating an output display including a search result set based on the refined search query.

* * * * *